Figure 1:
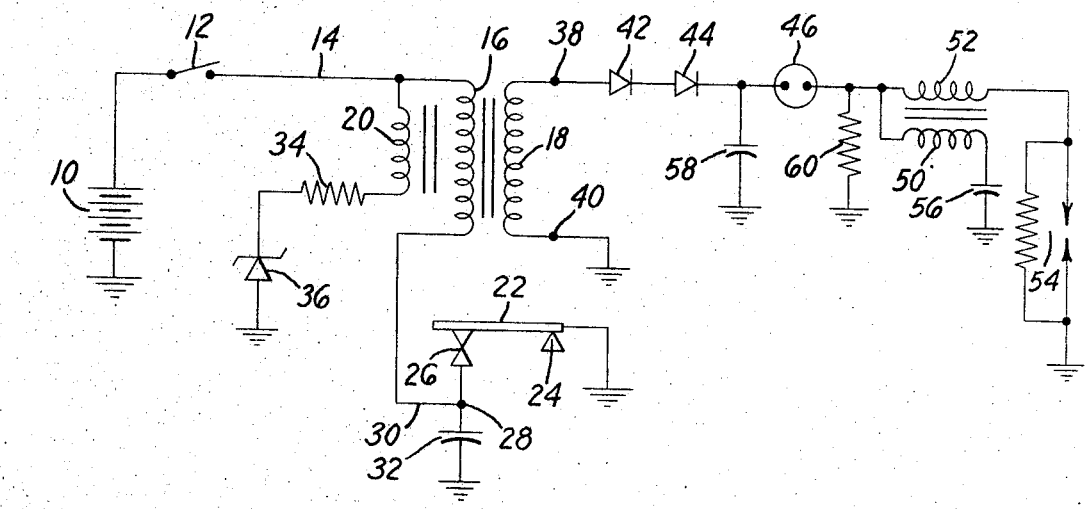

INVENTOR.
WAYNE E. DAMON
BY C. R. Meland
ATTORNEY

United States Patent Office 3,299,321
Patented Jan. 17, 1967

3,299,321
VIBRATOR-TRANSFORMER POWER SUPPLY SYSTEM HAVING AN OVERPOTENTIAL PROTECTION FEATURE
Wayne E. Damon, Martinsville, Ind., assignor to General Motors Corporation, Detroit, Mich., a corporation of Delaware
Filed Dec. 26, 1963, Ser. No. 333,464
1 Claim. (Cl. 317—14)

This invention relates to overvoltage protection for vibrator-transformers of a type which includes a primary winding and a secondary winding and vibrating contacts for opening and closing the circuit to the primary winding which is energized from a source of direct current.

It has been common practice in the past to provide a bias coil in addition to the normal windings on a vibrator-transformer in order to protect the vibrator transformer during high voltage transient conditions. In the normal arrangement, the bias coil is connected across the direct current source and when a transient high voltage condition exists, the current flow through the bias coil opens the vibrating contacts to open the circuit to the primary of the vibrator-transformer.

In the system where the bias coil is connected across the source of direct current, it is continuously energized from the source of direct current during normal conditions and during the overvoltage condition where it holds the vibrator contacts open.

In contrast to the just-described system, it is one of the objects of this invention to provide a voltage protection circuit for a vibrator-transformer where the bias coil is only energized during the overvoltage condition. This object is carried forward by connecting a voltage responsive switching device such as a Zener diode in series with the bias coil and with this arrangement, the Zener diode does not conduct until the overvoltage conditon occurs whereupon the bias coil is energized to hold open the vibrator contacts.

Still another object of this invention is to provide an overvoltage protection system for a vibrator-transformer where the bias coil is completely eliminated and wherein a controlling gate or voltage limiter such as a positively biased transistor is connected between a source of direct current and the primary of the vibrator-transformer, the transistor being conductive during normal voltage conditions but being switched to a series voltage regulating mode during an overvoltage condition wherein the regulator absorbs all voltage greater than a voltage determined by a Zener diode.

A further object of this invention is to provide a vibrator-transformer power supply circuit which is capable of sensing the input voltage and protecting the primary of the vibrator-transformer during high input transient voltages.

Still another object of this invention is to provide an overvoltage protection circuit for a vibrator-transformer which feeds an ignition circuit for a gas turbine engine.

Further objects and advantages of the present invention will be apparent from the following description, reference being had to the accompanying drawings wherein preferred embodiments of the present invention are clearly shown.

Figure 2:
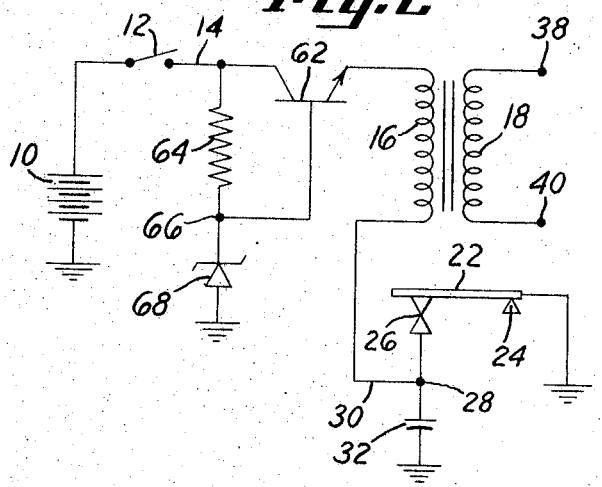

In the drawings:
FIGURE 1 is a schematic circuit diagram of an overvoltage protection system for a vibrator-transformer that is shown feeding a capacitor discharge ignition system.
FIGURE 2 is a schematic circuit diagram of a modified overvoltage protection system for a vibrator-transformer that can be used to feed an ignition system.

The present invention is to be described in connection with a gas turbine ignition system, but it will be appreciated by those skilled in the art that the transient or overvoltage protection system for the vibrator-transformer can be used to feed other types of electrical systems.

Referring now to the drawings and more particularly to FIGURE 1, the reference numeral 10 designates a source of direct current which may have a normal value of 28 volts but which at times fluctuates to higher values due to the transient voltages in the system. One side of the direct current source 10 is grounded and the opposite side is connected with a manually operable switch 12. The switch 12 when closed, feeds a conductor 14.

The direct current source 10 feeds a vibrator-transformer which has a primary winding 16, a secondary winding 18 and a bias coil 20. The vibrator-transformer includes an armature 22 which can pivot around point 24. The movement of armature 22 controls the opening and closing of the vibrator-contacts 26. These contacts are normally held closed by a spring (not shown) and are opened by flux generated in the primary 16 when it is energized. The contacts 26 therefore open and close continuously in a manner well-known to those skilled in the art when the vibrator-transformer is energized. The flux generated in bias coil 28 is capable of moving armature 22 to a position where contacts 26 are held open when coil 20 is energized. The secondary winding 18 is magnetically coupled to primary 16 in a conventional manner and with a turns ratio that provides a higher voltage from secondary 18.

It is seen that one side of the bias coil 20 and one side of the primary winding 16 are connected with conductor 14. The opposite side of primary winding 16 of the vibrator-transformer is connected with junction 28 and conductor 30. The capacitor 32 is connected between junction 28 and ground.

One side of the bias coil 20 is connected to one side of a resistor 34. A Zener diode 36 is connected between resistor 34 and ground. The Zener diode 36 prevents current flow between resistor 34 and ground until a predetermined voltage is applied across it whereupon it will break down and conduct current. Where the source of voltage 10 is normally 28 volts, the Zener diode may be selected to have a break down voltage of 30 volts.

The secondary winding 18 is connected with output terminals 38 and 40 which are used to supply an electrical load. In the system of FIGURE 1, the voltage appearing between terminals 38 and 40 is used to energize an ignition system for a gas turbine engine. This ignition system includes rectifiers 42 and 44, a trigger gap 46 and an ignition coil having a primary winding 50 and a secondary winding 52. In addition, this system includes a shunted surface gap semiconductor spark plug 54, capacitors 56 and 58, and a resistor 60.

When the switch 12 is closed, the vibrator-transformer is energized and a periodic sparking of the spark plug 54 will occur. Assuming that there has been no transient overvoltage condition, current flows from the source 10, through closed switch 12, through primary winding 16, through conductor 30, through the closed vibrator contacts 26 and then through the armature 22 to ground. Since there is no overvoltage condition at this time, the bias coil 20 will not be energized because the Zener diode 36 blocks current flow between resistor 34 and ground. As current flows through the primary winding 16, the contacts 26 open which breaks the circuit to the winding 16, and the contacts then reclose. As a result, the contacts 26 open and close rapidly causing a pulsating current to flow through primary 16 which is transformed to a higher voltage which appears across the secondary winding 18 and across output terminals 38 and 40.

The stepped up voltage appearing across output terminals 38 and 40 charges the capacitor 58 and when this capacitor has a charge which is sufficient to break down the gap 46, which is a voltage responsive gap, the capacitor 58 discharges through primary winding 50. This causes a voltage to be induced in secondary winding 52 which causes the plug 54 to fire.

Under normal voltage conditions, the plug 54 will be periodically fired each time gap 46 breaks down as long as the switch 12 is closed and this plug can be used to ignite the combustible mixture of a gas turbine engine.

Assuming now that a transient voltage condition exists where the voltage between conductor 14 and ground temporarily goes above 30 volts, the Zener diode 36 will break down and current will flow from conductor 14, through the bias coil 20, through resistor 34 and then through the Zener diode 36 to ground. The magnetic effect of the current flow through the bias coil 20 operates to temporarily hold the contacts 26 open until the transient voltage surge is over. In this manner, the vibrator-transformer is protected from transient voltage surges and is protected from any other condition that might cause an overvoltage condition between conductor 14 and ground.

In a conventional system, the bias coil 20 is connected directly to ground at its end opposite conductor 14 so that current continuously flows through this coil when switch 12 is closed. In contrast to this, it is seen that with the system of FIGURE 1, there is no current flow through the bias coil 20 except during the overvoltage condition. This is an advantage since the system of FIGURE 1 will consume less power than the normal system.

The system of FIGURE 1 has other advantages in that with the use of the Zener diode, the bias coil 20 can be wound with fewer turns of larger wire which therefore lowers the inductance of the bias circuit and enables the circuit to be designed with a substantially shorter time constant than the conventional bias coil circuit. With this arrangement, the time constant of the bias circuit can be made shorter than that of the transformer primary circuit. This permits the back voltage on the bias coil to decay more rapidly than the back voltage on the transformer primary. The vibrator contacts 26 are therefore opened faster as compared to the conventional bias coil arrangement where no Zener diode is used.

Referring now to FIGURE 2, a system is illustrated which can be used to supply a gas turbine ignition or exciter circuit and which provides overvoltage protection for the vibrator-transformer. In FIGURE 2, the ignition system has not been illustrated but it will be appreciated by those skilled in the art that the output terminals 38 40 illustrated in FIGURE 2 could be used to enerigze the same ignition system shown in FIGURE 1. In FIGURE 2, the same reference numerals have been used as were used in FIGURE 1 to identify the same parts in each figure.

In the system of FIGURE 2, the bias coil 20 has been eliminated and an NPN transistor 62 has been connected between power input conductor 14 and one side of the primary 16 of the vibrator-transformer. The emitter electrode of transistor 62 is connected to one side of the primary 16 of the vibrator-transformer. The collector of transistor 62 is connected with power input conductor 14. A resistor 64 has one side thereof connected with power conductor 14 and has its opposite side connected with junction 66. A Zener diode 68 is connected between junction 66 and ground. The base of transistor 62 is connected with junction 66.

In the system of FIGURE 2, the voltage of the direct current source 10 is again normally 28 volts. The break down voltage of Zener diode 68 is selected to be approximately 30 volts where the normal voltage appearing between conductor 14 and ground is in the neighborhood of 28 volts.

When the switch 12 is closed, the system of FIGURE 2 is energized and an output voltage will appear between output terminals 38 and 40 which can be used to energize an ignition system of the same type shown in FIGURE 1.

Assuming that the voltage appearing between conductor 14 and ground remains in its normal range, the Zener diode 68 will not break down and the base of transistor 62 will have a voltage which is positive with respect to its emitter and the transistor 62 will therefore switch on in its collector-emitter circuit. With transistor 62 turned on, current can flow from power conductor 14, through the collector-emitter circuit of transistor 62, through the primary 16, through conductor 30, and through closed contacts 26 to ground. The vibrator transformer will now operate in its normal manner with the transistor 62 completing the circuit between conductor 14 and the primary 16.

If an overvoltage condition exists which causes the voltage between conductor 14 and ground to temporarily rise to an abnormal value as by a transient voltage, the Zener diode 68 will break down and current will flow from conductor 14, through resistor 64 and through the Zener diode 68 to ground. This current flow causes a voltage drop across resistor 64 and maintains the voltage of junction 66 at the Zener breakdown level operating transistor 62 as an emitter follower. This in effect temporarily places a voltage regulator between conductor 14 an the primary 16 of the vibrator-transformer to protect the vibrator-transformer from the overvoltage condition. The resulting collector to emitter voltage absorbs the voltage in excess of the Zener breakdown level.

While the embodiments of the present invention as herein disclosed, constitute a preferred form, it is to be understood that other forms might be adopted.

What is claimed is as follows:

A vibrator-transformer power supply system having an overpotential protection feature comprising, input circuit means suitable for connection across a source of direct current potential, a vibrator-transformer having at least a primary winding, a secondary winding, a bias winding and a pair of magnetically operable vibrating contacts, electrical circuit means for connecting said primary winding and said vibrating contacts in series across said input circuit means, potential sensitive circuit means characterized by the ability to become electrically conductive with an applied potential greater than a predetermined magnitude and means for connecting said potential sensitive circuit means and said bias winding in series across said input circuit means whereby said vibrating contacts are magnetically operated to open in response to the energization of said bias winding upon conduction through said potential sensitive circuit means with overpotential conditions.

References Cited by the Examiner

UNITED STATES PATENTS

| 2,767,309 | 10/1956 | Schaner | 317—16 X |
| 2,971,102 | 2/1961 | Schultz | 317—16 X |
| 3,181,033 | 4/1965 | Bakker | 317—16 X |
| 3,227,940 | 1/1966 | Gilbert et al. | 317—31 X |

OTHER REFERENCES

Silicon Zener Diode and Rectifier Handbook, Semiconductor Products Division, Motorola, Inc., Phoenix, Arizona. Second edition, 1961, page 79.

Silicon Zener Diode and Rectifier Handbook, Semi-Conductor Products Division, Motorola, Inc., Phoenix, Arizona. Second edition, 1961, pages 87 and 90.

MILTON O. HERSHFIELD, *Primary Examiner.*

SAMUEL BERNSTEIN, *Examiner.*

R. V. LUPO, *Assistant Examiner.*